Aug. 13, 1929.   J. S. THOMPSON   1,724,151
FRICTION BRAKE
Original Filed May 1, 1926
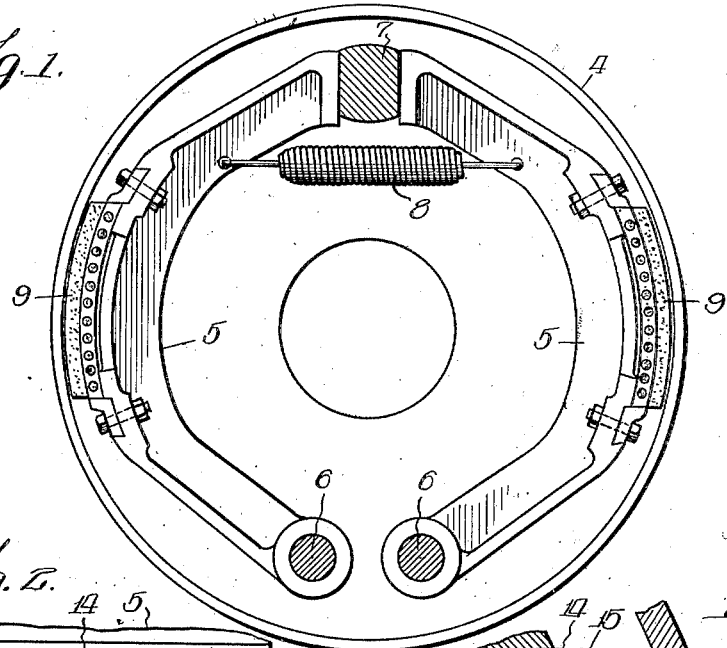
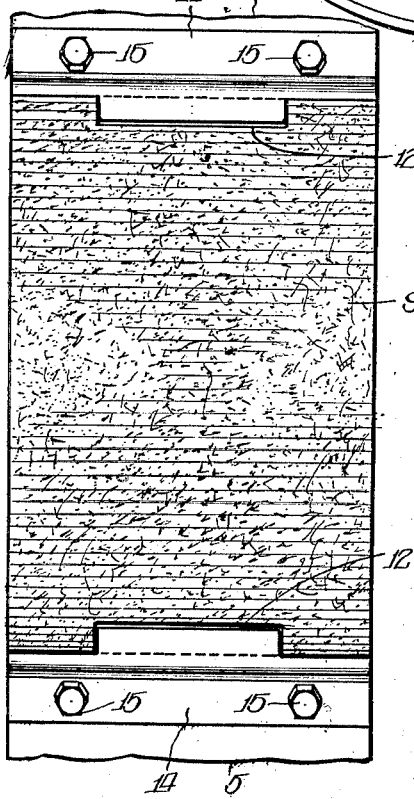
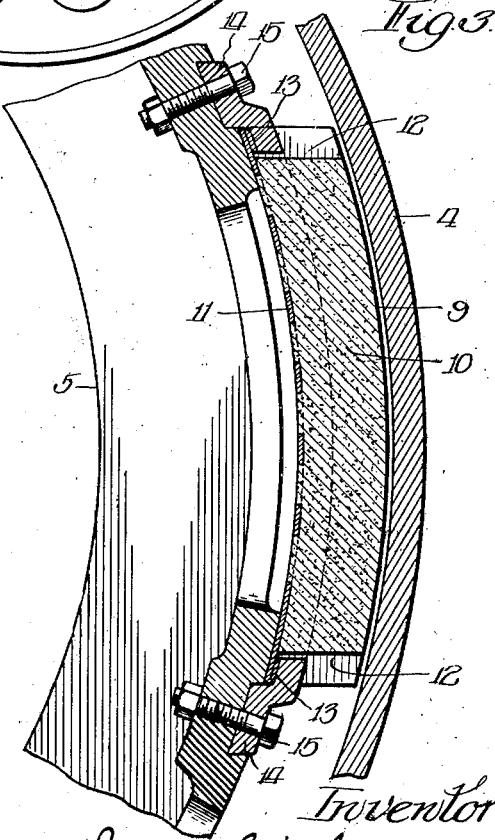
Inventor:
James S. Thompson
By Wm. O. Belt Atty.

Patented Aug. 13, 1929.

1,724,151

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Original application filed May 1, 1926, Serial No. 105,897. Divided and this application filed January 30, 1929. Serial No. 336,141.

This is a division of my application Serial No. 105,897 filed May 1, 1926.

The invention relates to friction brakes and while it is particularly adapted for expanding brakes arranged to make friction contact with a drum, which is a form of brake commonly employed in automotive vehicles, it can also be used in many other installations as will be apparent to those skilled in the art.

The object of the invention is to provide a friction brake shoe which is adapted to be readily and easily installed in a friction brake assembly and securely held in fixed position therein.

And a further object of the invention is to provide a friction brake shoe of novel construction having a body with recesses in its ends and extending through the wearing face of the shoe to facilitate engagement and disengagement of the means by which the block is secured in operative position in a brake assembly.

The fastening devices project into the recesses and prevent sidewise movement of the shoe by engagement with the side walls of the recesses.

In the accompanying drawings illustrating a selected embodiment of the invention Fig. 1 is a sectional elevation of parts of a brake assembly showing an arrangement in which my invention may be embodied.

Fig. 2 is a detail enlarged plan view of one of the blocks with the brake head broken away.

Fig. 3 is a sectional view of the parts shown in Fig. 2.

Referring to the drawings 4 is the brake drum, 5, 5 are the brake heads which are pivotally mounted on the studs 6, 6 and are adapted to be operated by the cam 7 and the spring 8 to move the friction shoes or blocks 9, 9 into and out of operative contact with the drum. The construction of the drum and the brake heads, the manner of mounting the brake heads and the mechanism for operating the brake heads are not parts of this invention, but are shown only to illustrate how the shoe may be used.

The shoe 9 has a body 10 of friction material and a metal back 11. The body is preferably made of a suitable friction producing composition and the back is preferably in the form of a shell in which the body is molded and to which the body is secured in any suitable manner. Each end of the body of the shoe is provided with a recess 12 spaced from the side edges of the shoe and extending from the metal back through the contact wearing face of the shoe, the metal of the back being folded upon itself at 13 forming double thickness in the bottom of the recess to be engaged by the devices which fasten the shoe or block to the head. These fastening devices may be in the form of lugs 14 which enter the recesses 12 and engage the parts 13 of the back at the bottom of the recesses, the lugs being detachably secured by bolts 15 to the head. The open recesses 12 form a convenient means whereby the lugs or other fastening devices may be readily and easily engaged with the shoe or block for securing it rigidly on the head.

I have shown one form of a brake shoe or block embodying my invention and in one type of brake assembly in the drawings but this is merely to illustrate the invention and I reserve the right to embody the invention in any form within the scope of the following claims and in any brake assembly to which it is or may be adapted.

I claim:

1. A friction brake shoe comprising a supporting back and a composition body secured thereon, said body having recesses inset from its ends to expose portions of said back and said recesses extending from said exposed portions through the wearing face of the shoe.

2. A friction brake shoe comprising a composition body and a supporting back secured thereon, said body having a recess in each end spaced from its sides, portions of the back forming the bottom of the recesses and the recesses extending from said bottom forming back portions through the wearing face of the shoe.

3. A friction brake shoe comprising a composition body and a supporting back secured thereon, said body having recesses in its ends spaced from its sides, portions of the back being of double thickness and forming the bottom of the recesses and the recesses extending from said double thickness portions through the wearing face of the shoe.

JAMES S. THOMPSON.